United States Patent [19]

Brooks et al.

[11] 4,086,264

[45] Apr. 25, 1978

[54] SELF SUPPORTED SKELETAL METAL CATALYSTS AND PROCESS FOR PRODUCING THEM

[75] Inventors: Clyde S. Brooks; Franklin D. Lemkey, both of Glastonbury; Gerald S. Golden, Windsor, all of Conn.

[73] Assignee: United Technologies Corporation, Hartford, Conn.

[21] Appl. No.: 741,830

[22] Filed: Nov. 12, 1976

[51] Int. Cl.² .................. B01J 21/04; B01J 23/40; B01J 23/74; B01J 35/06
[52] U.S. Cl. .................................. 252/454; 252/461; 252/463; 252/466 J; 252/466 PT; 252/467; 252/471; 252/472; 252/475; 252/476; 252/477 R
[58] Field of Search ............... 252/461, 477 Q, 477 R, 252/454, 463, 467, 466 J, 466 PT, 471, 472, 475, 476; 428/608, 613, 614

[56] References Cited

U.S. PATENT DOCUMENTS

| | | | |
|---|---|---|---|
| 3,407,125 | 10/1968 | Fehlner | 204/20 |
| 3,720,856 | 3/1973 | Brody | 313/309 |
| 3,769,240 | 10/1973 | Lew et al. | 252/477 R |
| 3,900,626 | 8/1975 | Brennan | 252/477 R |

*Primary Examiner*—W. J. Shine
*Attorney, Agent, or Firm*—Charles E. Sohl

[57] ABSTRACT

Supported fibrous skeletal metal catalysts and methods of producing such catalysts are described. The catalysts are produced by directionally solidifying a eutectic composition to produce a microstructure consisting of oriented intermetallic single crystal fibers in a metallic matrix. Selective means are employed to remove a portion of the matrix to expose a portion of the fibers. Leaching means are employed to preferentially remove one of the atomic species from the exposed intermetallic fiber. The exposed leached fibers are porous, have a high surface area and display catalytic activity, depending upon the starting eutectic composition.

8 Claims, 3 Drawing Figures

2000 X

5300 X

4,086,264

SELF SUPPORTED SKELETAL METAL CATALYSTS AND PROCESS FOR PRODUCING THEM

BACKGROUND OF THE INVENTION

Cross Reference to Related Application

This application is similar in some aspects to U.S. Ser. No. 741,831 filed concurrently which shares a common assignee.

1. Field of the Invention

This invention relates to the subject of supported metal skeletal or porous catalysts. Methods of changing the form and structure (i.e., surface area, particle shape, pore structure, surface and bulk composition) which control the ultimate performance of a skeletal type catalyst comprises the subject of the invention. This invention includes fabrication techniques and the resultant supported skeletal catalyst.

2. Description of the Prior Art

The skeletal form of catalyst is described in numerous patents including U.S. Pat. Nos. 1,628,190, 2,384,501; 3,627,790, and 3,809,658. Briefly, this type catalyst is formed by the chemical leaching of an intermetallic compound formed between a catalytically active metal and a less noble metal. The leaching preferentially removes the less noble metal and produces a porous structure having a high surface area predominantly comprised of the catalytically active metal. The catalytically active metals include, but are not limited to the transition metals. Intermetallic compounds between such a catalytically active element and a less noble element such as Al are usually employed.

In a different subject area, but one which relates to this invention, it is known that under certain solidification conditions an oriented microstructure may be produced in eutectic composition. This is taught in U.S. Pat. Nos. 3,124,452, 3,528,808; 3,552,953; 3,554,817; 3,564,940 and 3,671,223 all of which are assigned to the assignee of the present invention.

SUMMARY OF THE INVENTION

Articles having catalytically active surfaces, and methods for making these articles are described. The active surfaces have porous single crystal catalytic fibers protruding from a supporting matrix. The catalytic articles of the invention are prepared by the directional solidification of eutectic compositions which results in an article with a highly oriented fibrous microstructure. The eutectic is chosen so that the matrix is a solid solution of a less noble metal (Al, by way of example) and the fibrous second phase is a single crystal of an intermetallic compound between the less noble matrix element and a second more noble element which has catalytic properties. The second element is typically a transition metal. The directionally solidified article is then chemically treated so as to remove a portion of the matrix leaving the fibrous intermetallic phase protruding in relief. A chemical leaching treatment is then used to remove the matrix element from the protruding single crystal fibers, leaving a porous catalytically active protruding fiber. The leaching step may often be conveniently combined with the matrix removal step.

The foregoing and other objects, features and advantages of the present invention will become more apparent in the light of the following detailed description of the preferred embodiment thereof as shown in the accompanying drawing.

DESCRIPTION OF THE PREFERRED EMBODIMENTS

Figure 1:
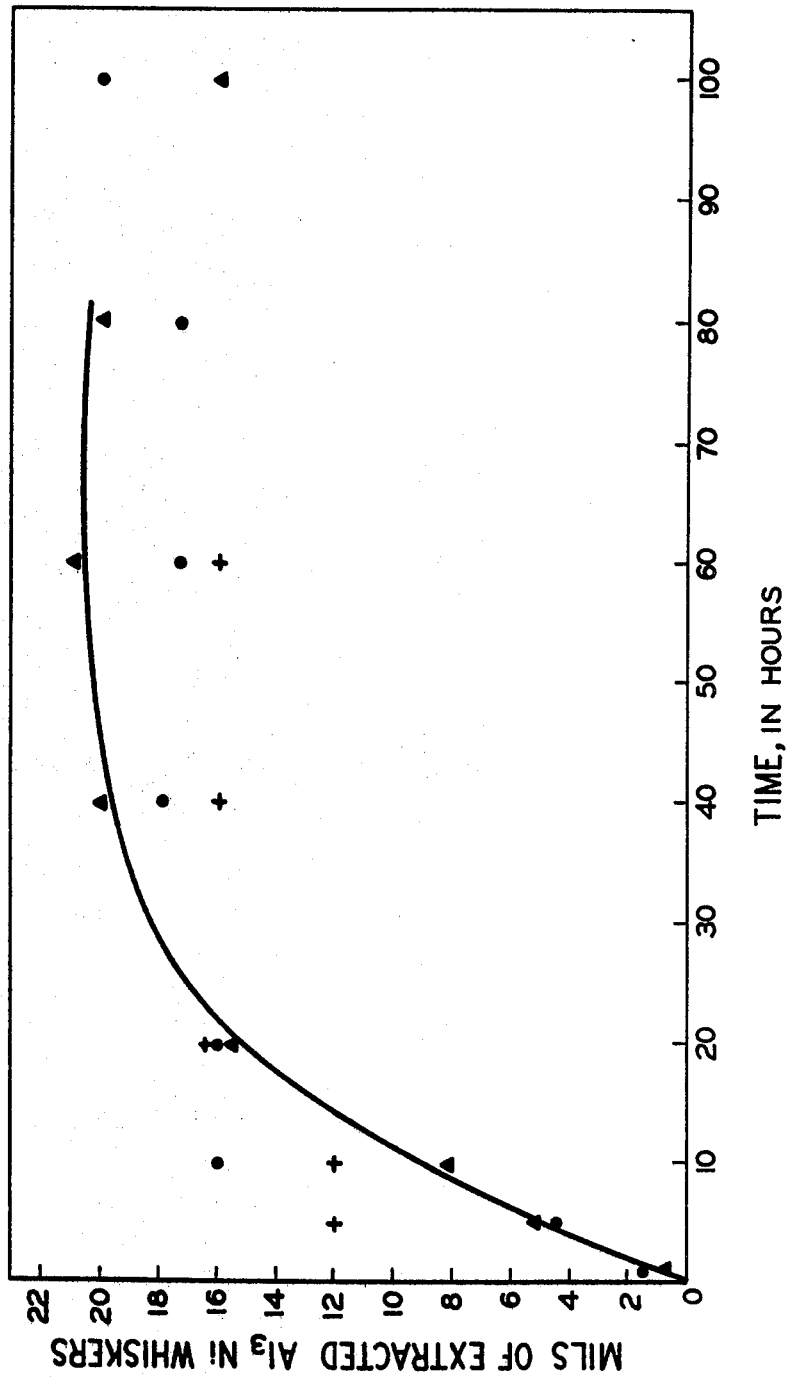
FIG. 1 shows the relationship between NaOH concentration, exposure time, and amount of matrix material removed in the Al-Al$_3$Ni eutectic system.

The prior art skeletal type catalysts are produced by the chemical leaching of intermetallic compounds to produce a highly porous, catalytically active article. The intermetallic phases are usually ground to particles or powder before the leaching and are then supported when used as a catalyst.

The present invention produces a catalyst in a similar fashion, (by leaching of an intermetallic compound), but the method of obtaining the intermetallic precursor, resulting catalyst, and supporting structure are unique. The catalyst of the present invention is a plurality of closely packed, uniformly spaced catalytically active single crystal fibers protruding from the surface of a supporting substrate. The fiber diameter and spacing are both on the order of microns in dimension. The substrate material from which the whiskers protrude preferably has a useful amount of ductility so that it may be formed into shapes such as plates and tubes.

The teachings of U.S. Pat. No. 3,124,452, which relates to the directional solidification of eutectic compositions, is incorporated herein by reference. Briefly, this patent discloses that slow progressive solidification of a molten eutectic composition wherein the solid-liquid interface may be constrained to be relatively flat and to move along a particular axis can produce an oriented fibrous microstructure wherein the fibrous second phase is oriented parallel to the direction of motion of the solid-liquid interface with controllable whisker sizes and spacings. Fiber diameters are typically from about 0.01 to about 10 microns and fiber lengths may range from about 10 microns to continuous over the entire length of the solidified article. The term fibrous will be used in this application to denote fiber-like morphologies, rod-like morphologies, plate-like morphologies, and mixtures of these morphologies, and the term fiber will be used to denote rods and plates as well as fibers. Although binary eutectics are usually employed, higher order eutectic compositions, such as ternary eutectics, may also be directionally solidified.

In the pure sense of the term, directional solidification implies a solidification process in which the solid-liquid interface is essentially flat. Since the resultant fibers are perpendicular to the solid-liquid interface, a flat interface will produce parallel fibers. If solidification parameters are relaxed (a faster rate of solidification and/or a lower thermal gradient across the interface), the solid-liquid interface will develop areas of curvature. This in turn reduces the degree of parallel alignment. For purposes of this invention, exact alignment is not necessary. It is only necessary that a high proportion of the fibers are substantially perpendicular to a particular plane. For purposes of this invention, the term directional solidification will be used to mean any eutectic solidification process which will result in more than about 50% of the fibers being oriented within about 45° of a particular plane.

This invention utilizes a class of eutectics having a structure in which the matrix is a solid solution of one element, which is not usually an active catalyst, and the fibrous oriented second phase is an intermetallic compound containing the matrix element and at least one second element. The second element is one which is catalytically active especially when prepared in a high surface area form. The major element in the solid solution matrix is preferably less noble than the catalytically active element in the second phase. This less noble matrix element is thus more active chemically and may be preferentially removed to expose the intermetallic fibrous second phase.

Preferential removal of the matrix to expose the fibers is an integral part of the process of the invention. Chemical removal is preferred and either acidic or basic solutions may be employed depending upon the matrix material. With aluminum matrices, caustic (basic) leaching solutions are preferred, for example, aqueous solutions containing up to about 25% NaOH may be employed. The chemical removal process may be accelerated by the application of heat, pressure, forced convection, an electric current or combinations thereof. (High vapor pressure matrices, such as zinc, might also be removed by thermal evaporation in a vacuum.) More generally, any method which preferentially removes the matrix may be employed.

The specific details of the matrix preferential removal step are not a part of this invention. Virtually, any process which will remove the matrix without excessively attacking the fibrous second phase may be employed.

The matrix preferential removal step is carried out until the fibers protrude from the surface of the desired amount, usually up to about 50 mils. The more the fibers protrude, the greater will be the total effective catalytic surface area. However, fibers which protrude excessively may be subject to mechanical damage in service.

A unique and useful feature of the catalyst of the invention is its renewable nature. In practical applications, all catalysts lose effectiveness over a period of time. This loss of effectiveness may be due to chemical changes such as poisoning of the catalyst, or to physical changes such as sintering which reduce the effective catalytic area. An inherent feature of the invention catalyst is that the fibers may be removed from the surface after they are no longer catalytically active and a new catalytic surface may be prepared by repeating the matrix removal and leaching steps. This renewable feature is a consequence of the continuous nature of the intermetallic fibers.

The protruding fibers, which are single crystals of intermetallic composition, may then be treated to selectively remove at least a portion of the noncatalytic element, to leave a porous catalytic structure behind. In general, however, the matrix removal step will have also removed at least a portion of the matrix element from the intermetallic fibers.

It is characteristic of directionally solidified eutectics that each individual fiber is a single crystal. This single crystal feature is effectively retained even after the selective matrix element removal step, and this highly textured single crystal type of structure provides acceptable mechanical properties, even after leaching.

The selective removal is performed, generally in accordance with the procedure which would be followed to prepare a prior art skeletal catalyst from the same intermetallic material.

The specific details of the selective leaching operation do not form part of this invention. Once the preferential chemical removal of the matrix has left the intermetallic fibers protruding from the matrix, any leaching treatment which has been used to convert the same intermetallic, in bulk form, to a catalyst may be used to convert the fibers to a catalytic form. Such leaching procedures are described, by way of example, in Journal of Catalysis, Vol. 14, pp. 247–256 (1969), Vol. 16, pp. 281–291 (1970), and Vol. 41, pp. 405–411 (1976) by J. B. Anderson et al, the contents of which are incorporated herein by reference. Because the element to be removed from the intermetallic is identical to the major matrix element, it is quite probable that the chemical treatment employed to preferentially attack the matrix may also tend to selectively leach the intermetallic fibers. Likewise, the selectively leaching step may well also tend to further remove the matrix phase. In most situations, it will be possible to combine these two steps.

In aluminum matrix systems, mineral acids may be used to attack the matrix without significantly affecting the intermetallic. The use of a mineral acid for matrix removal followed by a caustic leaching step permits more control over the leaching process and residual aluminum content in the catalytic fibers.

While virtually any eutectic which can be directionally solidified to form a less noble metallic solid solution and a more noble fibrous intermetallic phase may be employed, providing of course that the protruding fiber product which remains after leaching is catalytic, certain eutectic compositions are preferred. Eutectics having matrices based upon aluminum, copper, magnesium, zinc and silicon are preferred. Those of aluminum, copper and magnesium have useful ductility which permits the fabrication of catalytic articles from the directionally solidified eutectic, and thus are particularly preferred for certain applications. These applications include the fabrication of plates, tubes and reaction vessels having catalytic surfaces. Because of its great ductility, ease of chemical removal, and prior use in the production of bulk skeletal type catalysts, aluminum is the most preferred matrix element.

The catalytic element, that which combines with the matrix element to form the second phase intermetallic, is preferably selected from the group consisting of IB type metals, IVB metals, VB metals, VIB metals, VIIB metals, and VIII metals, wherein the Roman numeral metals designations refers to the conventional (long form) periodic table. Elements which have proven catalytic activity in skeletal form include nickel, platinum, osmium, palladium, ruthenium, rhenium, rhodium, gold, iridium, cobalt, iron, molybdenum, copper, silver, and alloys based on these elements. Preferred catalytic elements include ruthenium, rhodium, cobalt, nickel, platinum, iron, molybdenum, and mixtures thereof.

The preceding discussion of matrix elements and intermetallic compound elements is complete. However, not all combinations of these elements form eutectics which are amenable to directional solidification to form aligned continuous fibrous microstructures. The question of whether a eutectic forms between two particular elements may be resolved by reference to any of the readily available compilations of phase diagrams. The applicability of directional solidification to a particular eutectic alloy system, to produce the desired fibrous microstructure, may easily be experimentally determined by one skilled in the art.

This invention also contemplates the production of alloy type self-supported skeletal catalysts. It is known that in all eutectics there are significant differences (chemical, electrical, physical) between the atomic species which comprise the matrix and the second atomic species which forms the intermetallic compound. If another atomic species is added prior to solidification, it will preferentially segregate (partition) to one of the phases. The greater the property difference between the phases and the more similar the added elements is to one of the phase constituents, the greater will be the degree of partitioning. This behavior may be used to advantage in the production of alloy skeletal type catalysts. Consider, for example, the aluminum-nickel system, the classic system used to produce skeletal nickel. After directional solidification according to this invention, the structure consists of oriented $NiAl_3$ single crystal intermetallic fibers in an Al-Ni solid solution (the percent nickel in solid solution will usually be less than about .05 weight percent). The solid solubility of platinum in nickel is extensive. It is entirely miscible in the liquid and solid state while, at the same time, the solid solubility of platinum in aluminum is vanishingly small (less than 0.01 weight percent at the eutectic temperature of 655.5° C). Thus, if a reasonable amount of platinum were added to the Al-Ni mixture prior to solidification, the platinum would be found to segregate to the second phase where it would substitute for some of the nickel in the fibers. After removal of the matrix and chemical leaching of the fibers the resultant skeletal fibers would be of a Ni-Pt alloy. As a general rule, in fabricating alloy catalysts of this type one would look for greater solid solubilities between the desired catalyst alloy elements than the solid solubility of either element in the matrix.

The partitioning phenomena might also be used to advantage in modifying the matrix properties. For some applications, improved matrix mechanical properties, and/or chemical stability might be desired and preferential matrix alloying may solve these problems. For example, in aluminum matrices, additions of copper, silicon, manganese, zinc, and magnesium may be made to improve mechanical properties. In the case of magnesium matrices, zinc and aluminum might be utilized.

The details of the present invention may be better understood by consideration of the following illustrative examples.

EXAMPLE 1

An alloy of aluminum containing 6.2 weight percent nickel was melted and directionally solidified by withdrawing an elongated crucible from a heated furnace at a rate of 11 cm/hr. The resultant structure contained about 11 volume percent of oriented $Al_3Ni$ fibers. The fiber diameter was about 0.4 μm, the interfiber spacing was about 1.6 μm and the fiber lengths were essentially infinite. The nature of the directional solidification process was such that the fiber composition was exactly $Al_3Ni$ and the fibers were single crystals.

EXAMPLE 2

Samples of the directionally solidified material produced in Example 1 were immersed in aqueous solutions of NaOH to selectively remove the aluminum matrix. Solutions of concentrations 2%, 4% and 8% were employed at room temperature for times of up to 100 hours. FIG. 1 shows the relationship between concentration, exposure time, and length of intermetallic fiber exposed. The curve drawn is approximately parabolic, characteristic of a diffusion controlled reaction. The reaction rate diminishes after about 20 hours as a result of the increasing length of exposed fibers which mask the exposed surface of the aluminum matrix. The curve could be shifted by changing for example the reaction temperature, applying an electric current, or by directionally solidifying the alloy at a different velocity so as to change the fiber spacing.

EXAMPLE 3

Figure 2:
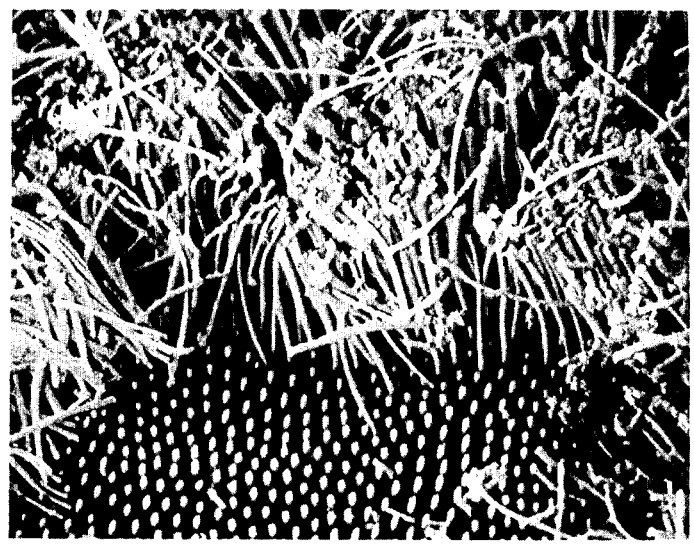
FIG. 2 shows a scanning electron micrograph of a catalyst prepared according to this invention showing fibers of porous nickel protruding from a substrate of Al-Al$_3$Ni eutectic composition.

A sample of the directionally solidified materials produced in Example 1 was immersed in a 2% NaOH solution at room temperature for one hour to expose the $Al_3Ni$ fibers. The preferential leaching of the fibers was performed concurrently. The sample was scratched to remove some of the exposed fibers. FIG. 2 shows a scanning electron micrograph of the scratched portion. The regularity and density of the exposed fibers can be seen in this figure.

EXAMPLE 4

The leached specimen of Example 3 was evalulated in a microreactor in which the reaction

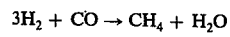

$$3H_2 + CO \rightarrow CH_4 + H_2O$$

was performed at 415° C. This reaction is the predominate reaction in many important processes such as coal gasification. A sample of the invention containing approximately 1.7 mg of porous catalytic nickel exhibited a conversion activity of 651 moles $H_2$ reacting per second per gram of catalytic nickel. A sample of commercial skeletal nickel which contained about 317 mg Ni showed a conversion efficiency of 115 μ moles $H_2$ per second per gram Ni. The catalyst of the present invention was superior in catalytic activity to the commercial catalyst.

EXAMPLE 5

A magnesium alloy containing 22.4 weight percent Ni was directionally solidified at a rate of 4 cm/hr to produce an oriented structure consisting of $Mg_2Ni$ single crystal plates in an Mg matrix.

Figure 3:
FIG. 3 shows a transmission electron micrograph of porous nickel plates produced by leaching of a directionally solidified Mg-Mg$_2$Ni eutectic article.

These plates were extracted from the Mg matrix using a solution of 90% $H_3PO_4$ + 10% ethanol or a time of one and one half hours. This same matrix dissolution treatment also preferentially leached the Mg from the $Mg_2Ni$ plates leaving the structure shown in FIG. 3. While no further evaluation was performed, the leached nickel plates appeared to have a highly porous (high surface area) structure having potential utility as a catalyst.

EXAMPLE 6

An aluminum eutectic alloy containing 3.1 weight percent Pt was directionally solidified under various conditions. Solidification rates varied from 2 cm/hr to 1,000 cm/hr. The resultant structure was comprised of $Al_4Pt$ single crystal oriented fibers in an Al matrix. The fiber diameters varied with the solidification velocity, from 15,000 A diameter at 2 cm/hr to 800 A at 1,000 cm/hr. The matrix was completely removed using a 2% NaOH solution for 1440 minutes at 68° F. The intermetallic fibers were leached concurrently. The surface area of the leached fibers was evaluated using the B.E.T. technique in which the amount of nitrogen required to form a monolayer on the porous structure is determined. The maximum surface area observed was 142 m²/gm for material solidified at 50 cm/hr.

EXAMPLE 7

An aluminum eutectic alloy containing 5.89% Ni, 0.52% RH was directionally solidified at a rate of 50 cm/hr. The resultant microstructure consisted of single crystal fibers of Al$_3$(Ni, Rh) in an aluminum matrix. The fibers were exposed using a solution of 2% NaOH at 68° F for 120 minutes. This treatment completely removed the matrix leaving loose fibers and fragments. The ratio of Rh to Ni was about 0.05. When the sample was pretreated by heating in a $10^{-4}$ torr vacuum at 300° C for 30 minutes it displayed a B.E.T N$_2$ surface area of 173 meters per gram of fiber. After an additional petreatment step of treatment of $10^{-4}$ torr for 60 minutes at 200° C the hydrogen chemisorption (measured at 100 torr, 100° C) was found to be 271 μ moles per gram of fiber, corresponding to a metal surface area of 20 m²/g., a high value indicative of potential catalytic activity. Another similar sample having a RH:Ni value of 0.22 displayed evidence of possible segregation (by ISS/SIMS) of Rh (the more catalytically active element) to the surface of the porous fiber after pretreatment for 30 minutes at $10^{-4}$ torr followed by 30 minutes at 300° C in hydrogen at one third atmospheric pressure. Further valuations of surface area after high temperature exposure indicated that the sample was resistant to thermal sintering.

Although this invention has been shown and described with respect to a preferred embodiment thereof, it should be understood by those skilled in the art that various changes and omissions in the form and detail thereof may be made therein without departing from the spirit and scope of the invention.

Having thus described typical embodiments of our invention, that which we claim as new and desire to secure by Letters Patent of the United States is:

1. A metallic article having at least one catalytically active surface, comprising:
   a. a directionally solidified substrate of substantially eutectic composition, having a microstructure which includes a metallic solid solution matrix and a plurality of single crystal intermetallic fibers, said fibers being oriented generally normal to the catalytic surface;
   b. a plurality of porous metallic single crystal fibers of high surface area which protrude from the substrate, each of said fibers being an extension of an intermetallic fiber within the substrate, said porous fibers being comprised predominantly of at least one catalytically active metal.

2. An article as in claim 1 wherein the matrix is less noble than the predominant metal constituent of the porous fibers.

3. An article as in claim 1 wherein the solid solution matrix is comprised predominantly of an element selected from the group consisting of Al, Mg, Zn, Cu, and Si.

4. An article as in claim 1 wherein the porous protruding fibers are comprised predominantly of an element selected from the group consisting of the IB metals, the IVB metals, the VB metals, the VIB metals, the VIIB metals, and the VIII metals and mixtures thereof.

5. An article as in claim 4 wherein the porous protruding fibers are comprised predominantly of an element selected from the group consisting of ruthenium, rhodium, cobalt, nickel, platinum, iron, molybdenum, and mixtures thereof.

6. An article as in claim 1 based on a eutectic between aluminum and a material selected from the group consisting of nickel, platinum, ruthenium, rhodium, molybdenum, cobalt, and iron, and mixtures thereof.

7. A process for producing metallic articles having at least one catalytic surface including the steps of:
   a. providing a eutectic composition which will produce a microstructure which includes a metallic solid solution matrix containing a discrete intermetallic phase, said intermetallic phase being a compound between the predominant element of the matrix phase and a catalytically active metal and said predominant element of the matrix phase being less noble than the catalytically active element;
   b. directionally solidifying the eutectic composition to provide a plurality of generally aligned intermetallic fibers in a metallic solid solution matrix;
   c. preferentially removing a portion of the matrix to expose a portion of the intermetallic fibers;
   d. preferentially removing at least a portion of the less noble element from the protruding fibers whereby a plurality of porous protruding catalytically active fibers of high surface area are produced.

8. A process as in claim 7 in which steps c. and d. are combined.

* * * * *